(12) United States Patent
Minami et al.

(10) Patent No.: US 10,525,772 B2
(45) Date of Patent: Jan. 7, 2020

(54) PNEUMATIC TIRE

(71) Applicant: The Yokohama Rubber Co., LTD., Minato-ku, Tokyo (JP)

(72) Inventors: Yuji Minami, Hiratsuka (JP); Masataka Kubota, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 410 days.

(21) Appl. No.: 14/769,676

(22) PCT Filed: Feb. 22, 2013

(86) PCT No.: PCT/JP2013/054587
§ 371 (c)(1),
(2) Date: Aug. 21, 2015

(87) PCT Pub. No.: WO2014/128933
PCT Pub. Date: Aug. 28, 2014

(65) Prior Publication Data
US 2016/0001599 A1 Jan. 7, 2016

(51) Int. Cl.
*B60C 11/03* (2006.01)
*B60C 3/04* (2006.01)
(Continued)

(52) U.S. Cl.
CPC ............... *B60C 3/04* (2013.01); *B60C 5/00* (2013.01); *B60C 11/033* (2013.01);
(Continued)

(58) Field of Classification Search
CPC ............. B60C 11/033; B60C 11/0332; B60C 2011/0381; B60C 2011/0383; B60C 2011/0348; B60C 3/04
See application file for complete search history.

(56) References Cited

U.S. PATENT DOCUMENTS

| 4,955,416 A | 9/1990 | Takeuchi et al. |
| 5,309,963 A * | 5/1994 | Kakumu ............. B60C 11/0318 152/209.18 |

(Continued)

FOREIGN PATENT DOCUMENTS

| CN | 101878120 | 11/2010 |
| CN | 102821981 | 12/2012 |

(Continued)

OTHER PUBLICATIONS

English machine translation of JP2012-091736, dated May 2012.*
(Continued)

*Primary Examiner* — Robert C Dye
(74) *Attorney, Agent, or Firm* — Thorpe North & Western (57) ABSTRACT

The present technology relates to a pneumatic tire in which the ratio of the total width SW and the outer diameter OD satisfies SW/OD≤0.3, and grooves are provided on the tread portion. In the ground contact region of the tread portion, when the groove area ratio in the ground contact area is GR, the ground contact width is W, the region having a width of 50% of the ground contact width W and the tire equatorial plane as center is the center region, the groove area ratio in the center region is GCR, the ground contact region on the outer side in the tire width direction of the center region is the shoulder region, and the groove area ratio in the shoulder region is GSR, the ground contact region of the tread portion is formed to satisfy 10%≤GR≤25% and GCR>GSR.

8 Claims, 4 Drawing Sheets

(51) Int. Cl.
*B60C 5/00* (2006.01)
*B60C 11/12* (2006.01)

(52) U.S. Cl.
CPC ...... *B60C 11/0306* (2013.01); *B60C 11/0327* (2013.01); *B60C 11/0332* (2013.01); *B60C 11/1259* (2013.01); *B60C 2011/0334* (2013.01); *B60C 2011/0355* (2013.01); *B60C 2011/0358* (2013.01); *B60C 2011/0367* (2013.01); *B60C 2011/0383* (2013.01); *B60C 2011/0395* (2013.01)

(56) References Cited

U.S. PATENT DOCUMENTS

| | | | | |
|---|---|---|---|---|
| 5,343,914 | A | * | 9/1994 | Wako ................. B60C 11/11 152/209.18 |
| 7,422,043 | B2 | * | 9/2008 | Miyazaki ............. B60C 11/11 152/209.22 |
| 2004/0211501 | A1 | * | 10/2004 | Kajita ............... B60C 11/0306 152/209.15 |
| 2006/0254684 | A1 | * | 11/2006 | Tamura .............. B60C 11/0306 152/209.18 |
| 2010/0300588 | A1 | | 12/2010 | Otsuji |
| 2013/0042953 | A1 | | 2/2013 | Kuwayama |
| 2013/0048173 | A1 | | 2/2013 | Kiwaki |
| 2013/0220501 | A1 | | 8/2013 | Hatanaka et al. |
| 2013/0263987 | A1 | | 10/2013 | Otsuji |
| 2013/0269847 | A1 | | 10/2013 | Otsuji |
| 2014/0158263 | A1 | * | 6/2014 | Hatanaka ............ B60C 3/04 152/209.18 |

FOREIGN PATENT DOCUMENTS

| | | | |
|---|---|---|---|
| EP | 0231448 | * | 8/1987 |
| EP | 2 554 402 | | 2/2013 |
| JP | S61-200004 | | 9/1986 |
| JP | H01-244902 | | 9/1989 |
| JP | H11-28911 | | 2/1999 |
| JP | 2012-091736 | | 5/2012 |
| JP | 2013-028289 | | 2/2013 |
| WO | WO 2009/069585 | | 6/2009 |
| WO | WO 2011/122170 | | 10/2011 |
| WO | WO 2011/135774 | | 11/2011 |
| WO | WO 2012/066725 | | 5/2012 |
| WO | WO 2012/066725 A1 | | 5/2012 |
| WO | WO2013/014950 | * | 1/2013 |

OTHER PUBLICATIONS

English machine translation of EP0231448. (Year: 1987).*
International Search Report for International Application No. PCT/JP2013/054587 dated Apr. 9, 2013, 4 pages, Japan.

* cited by examiner

(PRIOR ART)

PNEUMATIC TIRE

TECHNICAL FIELD

The present technology relates to a passenger vehicle pneumatic tire with improved fuel economy.

BACKGROUND

Conventionally, pneumatic tires that reduce rolling resistance have been proposed in order to contribute to the fuel economy of vehicles such as hybrid vehicles (HV) and electric vehicles (EV) in particular. In recent years, there is an even higher demand for pneumatic tires to make a higher contribution to the fuel economy of vehicles, as concerns for the environment increase.

Reducing the total width (SW) of a pneumatic tire so that the front projected area is decreased to reduce the air resistance around the tire is known as a method of reducing the rolling resistance of pneumatic tires (for example, see International Patent Publication No. WO/2011/135774).

However, with the method as described above, the ground contact width is reduced as the total width of the pneumatic tire is reduced, so it is necessary to increase the outer diameter (OD) in order to maintain a constant load capacity. Therefore, the ground contact length of the pneumatic tire becomes comparatively longer.

When the ground contact length of the pneumatic tire is increased, the water drainage properties (wet performance) are greatly improved. On the other hand, by reducing the ground contact width, the cornering force (CF) is reduced, and therefore the steering stability may be reduced.

SUMMARY

The present technology provides a pneumatic tire capable of reducing the rolling resistance and improving the associated degradation in steering stability performance.

The present technology provides
a pneumatic tire including grooves on a tread portion,
the ratio of a total width SW and an outer diameter OD of the pneumatic tire SW/OD satisfying:

$SW/OD \leq 0.3$, and in a ground contact region of the tread portion, when a groove area ratio with respect to a ground contact area is GR, a ground contact width is W, a region having a width of 50% of the ground contact width W and a tire equatorial plane as center is a center region AC, a groove area ratio in the center region AC is GCR, a ground contact region on an outer side in a tire width direction from the center region AC is a shoulder region AS, and a groove area ratio in the shoulder region AS is GSR, the ground contact region of the tread portion being formed to satisfy:

10%≤$GR$≤25%

$GCR > GSR$.

According to the pneumatic tire of the present technology, the rolling resistance can be reduced while improving the associated degradation in steering stability performance.

The present technology can be further sufficiently understood from the following description of preferred embodiments of the present technology together with the attached drawings.

DETAILED DESCRIPTION

Embodiments

Figure 1:
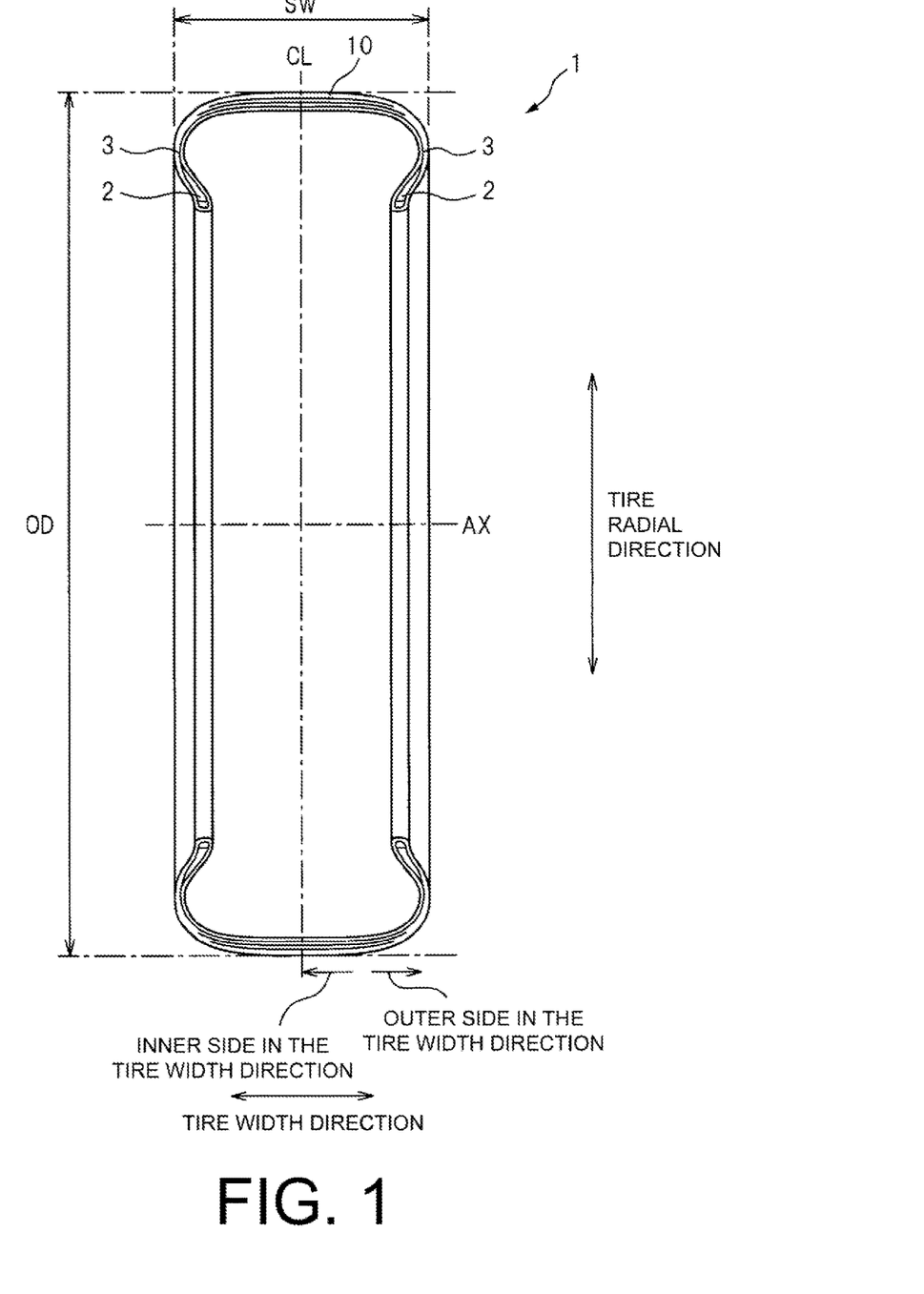
FIG. 1 is a meridian cross-sectional view of a pneumatic tire according to an embodiment of the present technology.

The following is a description of a pneumatic tire 1 according to an embodiment of the present technology, with reference to the drawings. FIG. 1 is a meridian cross-sectional view of the pneumatic tire 1 according to the embodiment of the present technology. Note that the pneumatic tire 1 according to the present embodiment has a meridian cross-section form the same as a conventional pneumatic tire. Here, the meridian cross-section form of the pneumatic tire refers to the cross-sectional shape of the pneumatic tire as it appears on a plane normal to the tire equatorial plane CL.

In the following description, "tire radial direction" refers to a direction perpendicular to the rotational axis AX of the pneumatic tire 1. Also, "tire circumferential direction" refers to the direction of rotation about the rotational axis AX as center (see FIG. 2). Additionally, "tire width direction" refers to the direction parallel to the rotational axis AX; "inner side in the tire width direction" refers to the side toward the tire equatorial plane (tire equator line) CL in the tire width direction; and "outer side in the tire width direction" refers to the side distanced from the tire equatorial plane CL in the tire width direction. "Tire equatorial plane CL" refers to a plane that is perpendicular to the rotational axis AX of the pneumatic tire 1 and that passes through the center of the tire width of the pneumatic tire 1. "Tire equator line" refers to a line along the tire circumferential direction of the pneumatic tire 1 that lies on the tire equatorial plane CL. In this specification and the drawings, "tire equator line" is given the same reference symbol "CL" as that given to the tire equatorial plane.

In the tire meridian cross-section view, the pneumatic tire 1 according to the present embodiment includes a pair of bead portions 2, sidewall portions 3 connected to the bead portions, and a tread portion 10 connected to the sidewall portions.

Note that there is no particular limitation on the inner structure of the pneumatic tire in the present technology. The inner structure of the pneumatic tire varies depending on the performance or design required for the pneumatic tire, and is preferably determined in order to satisfy various requirements through tests or simulation, for example.

The pneumatic tire 1 according to the present embodiment is formed so that the ratio of the total width SW and the outer diameter OD satisfies the relationship:

$SW/OD \leq 0.3$              <1>.

Note that in the present technology, the total width SW is the distance between the two sidewalls including any design on the sidewalls, when the pneumatic tire 1 is assembled onto a rim, and filled with an internal pressure of 230 kPa (or any set internal pressure) in order to specify the dimensions of the pneumatic tire 1, in the unloaded state. Also the outer diameter OD is the outer diameter of the tire at this time. Note that the internal pressure of 230 kPa is selected in order to specify the dimensions of the pneumatic tire as stated above. Therefore, it should be noted that provided the pneumatic tire 1 according to the present technology is filled with an internal pressure within the range normally used, the effect of the present technology is exhibited, and filling with an internal pressure of 230 kPa is not essential in terms of implementing the present technology.

Here, the rim used in the present technology has a diameter compatible with the inner diameter of the pneumatic tire 1, and has a nominal rim width corresponding to the specified rim width Rm (mm) given in Table 2 that is closest to the value (Rm=K1×Sn) obtained from the product of the nominal tire cross-sectional width Sn and the coefficient K1 from Table 1 corresponding to the aspect ratio of the tire assembled onto the rim, in accordance with ISO 4000-1:2001.

TABLE 1

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm (mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Figure 2:
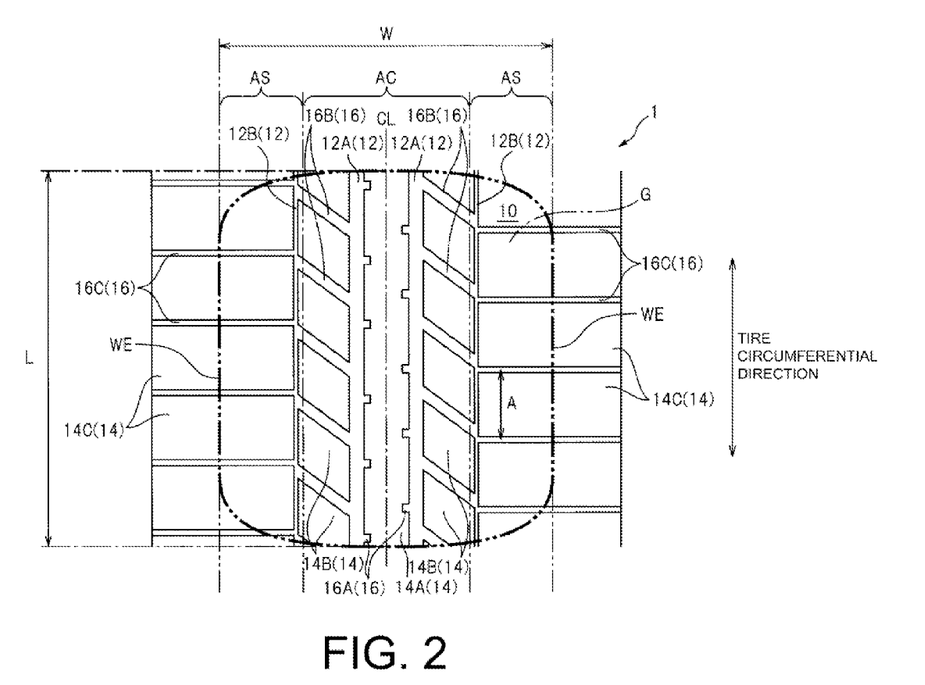
FIG. 2 is a plan development view illustrating a portion of the tread portion of the pneumatic tire according to an embodiment of the present technology.

FIG. 2 is a plan development view illustrating a portion of the tread portion 10 of the pneumatic tire 1 according to an embodiment of the present technology. Four circumferential grooves 12A, 12B extending in the tire circumferential direction, and land portions 14A, 14B, 14C partitioned by the circumferential grooves 12A, 12B are formed on the tread portion 10 of the pneumatic tire 1 according to the present embodiment. A plurality of lateral grooves 16A, 16B, 16C extending in a direction that traverses the tire circumferential direction and are grooves arranged on the tread portion 10 other than the circumferential grooves 12A, 12B is formed in the land portions 14A, 14B, 14C respectively. Note that in this specification, grooves 12, 16 refer generically to the circumferential grooves 12 and the lateral grooves 16, and in the present technology, lateral grooves 16 have a groove width of not less than 1.5 mm.

In the pneumatic tire 1 according to the present embodiment, in the ground contact region G of the tread portion 10 when contacting the flat ground surface with a load applied corresponding to 80% of the load capacity, the groove area ratio GR in the ground contact area, the groove area ratio GCR in the center region AC, and the groove area ratio GSR in the shoulder region AS are formed so as to satisfy the following relationships:

$$10\% \leq GR \leq 25\% \qquad <2>$$

$$GCR > GSR \qquad <3>.$$

In the present technology, the ground contact region G is the region of ground contact patch when the pneumatic tire 1 is assembled onto the rim as described above, inflated with an internal pressure of 230 kPa, and contacts a flat ground surface with a load corresponding to 80% of the load capacity applied. The ground contact width W is the maximum width in the tire width direction within the ground contact region. The ground contact length L is the maximum length in the tire circumferential direction within the ground contact region. Also, in the present technology, the load capacity is defined based on ISO 4000-1: 1994. For a size for which the load capacity index is not set in that ISO standard, the load capacity can be determined by a separate calculation taking into consideration conformity with the standards of each country, and in this case, the load capacity is calculated based on the standards of each country. Therefore, in the present technology, the load capacity for each tire size is calculated from the following calculation equation (c), which is published in "Calculation of Load Capacity" in the commentary to JIS D 4202-1994, which is the actual load capacity calculation equation used in the JIS specification.

$$X = K \times 2.735 \times 10 - 5 \times P^{0.585} \times Sd^{1.39} \times (D_R - 12.7 + Sd)$$

where, X=load capacity (kg)

K=1.36

P=230 (=air pressure (kPa))

$Sd = 0.93 \times S_{.75} - 0.637d$ $S_{.75} = S \times ((180° - \mathrm{Sin}^{-1}((Rm/S))/131.4°)$ S=design cross-sectional width (mm)

$R_m$=rim width corresponding to the design cross-sectional width (mm)

$d = (0.9 - \mathrm{aspect\ ratio}\ (-)) \times S_{.75} - 6.35$ $D_R$=reference value for the rim diameter (mm)

Also, the groove area ratio GR is the ratio of the groove area to the sum of the land portion area and the groove area within the ground contact region G (=ground contact area).

In addition, as illustrated in FIG. 2, the center region AC is a region within the ground contact region G having a width of 50% of the ground contact width W with the tire equatorial plane CL as center, and the shoulder region AS is a region within the ground contact region G located on the outer side in the tire width direction of the center region AC. Also, the groove area ratio GCR in the center region AC is the ratio of the groove area with respect to the sum of the land portion area and the groove area in the center region AC, and the groove area ratio GSR in the shoulder region AS is the ratio of the groove area with respect to the sum of the land portion area and the groove area in the shoulder region AS.

According to the pneumatic tire 1 of the present embodiment, the following actions and effects can be obtained.

(1) The pneumatic tire 1 according to the present embodiment is formed so that the ratio of the total width SW and the outer diameter OD satisfies the relationship in the above equation <1>. Accordingly, the total width SW relative to the outer diameter OD is smaller compared with a pneumatic tire of normal size (for example, 205/55R16 (SW/OD=0.32)). As a result, the front projected area of the pneumatic tire 1 is smaller, so the air resistance around the tire is reduced, and therefore the rolling resistance of the pneumatic tire 1 can be reduced. On the other hand, if the total width SW is simply made smaller, the load capacity of the pneumatic tire 1 will be reduced. However, by satisfying equation <1>, the outer diameter OD is increased relative to the total width SW, so the reduction in load capacity can be suppressed.

(2) The pneumatic tire 1 according to the present embodiment is formed so that the groove area ratio GR relative to the ground contact area takes a value in the range indicated by the above equation <2>. This range of groove area ratio GR is set lower compared with a normal pneumatic tire. Accordingly, the steering stability can be increased with increasing the stiffness of the tread portion 10 by increasing the area of ground contact of the land portions 14. If the groove area ratio GR is higher than 25%, the stiffness of the tread portion 10 is reduced, so it is not possible to obtain sufficient cornering force and the steering stability cannot be increased. Also, if the total width SW is narrow, the water drainage properties are improved as stated above, but if the groove area ratio GR is reduced to less than 10%, the grooves 12, 14 provided on the tread portion 10 are reduced so sufficient water drainage cannot be obtained on the ground contact region G, so it is difficult to maintain the overall water drainage properties.

(3) The pneumatic tire 1 according to the present embodiment is formed so that the groove area ratio GCR in the center region AC and the groove area ratio GSR in the shoulder region AS satisfy the relationship of the above equation <3>. Accordingly, there are fewer grooves provided in the shoulder region AS than in the center region AC. As a result, the reduction in water drainage properties due to the comparatively low groove area ratio GR can be suppressed by satisfying the above equation <2>. In addition, the stiffness of the tread portion 10 in the shoulder region AS is increased by increasing the area of the land portions 14 located in the shoulder region AS in contact with the ground compared with that in the center region AC. As a result, sufficient cornering force can be obtained, and therefore the steering stability can be improved.

(4) As described in (1), the pneumatic tire 1 according to the present embodiment has an outer diameter OD that is relatively larger and a total width SW that is relatively narrower compared with a pneumatic tire of normal size. Therefore, it is anticipated that vehicle reduced space occupation, improvement in design, and in addition, improvement in wet performance resulting from the longer ground contact length, in particular resistance to hydroplaning, can be achieved.

Note that more preferably, the groove area ratio GR satisfies the relationship:

$$10\% \leq GR \leq 20\%.$$

This is because the steering stability can be further improved by increasing the stiffness of the tread portion 10 by further increasing the area of the land portions 14 in contact with the ground in the ground contact region G.

Also, preferably, the ratio of the groove area ratio GCR and the groove area ratio GSR in the ground contact region G of the tread portion 10 is formed so as to satisfy the relationship:

$$0 < GSR/GCR \leq 0.6 \qquad <4>$$

and more preferably, is formed so as to satisfy the relationship:

$$0.1 \leq GSR/GCR \leq 0.4.$$

This is because the steering stability can be further improved by increasing the stiffness of the tread portion 10 in the shoulder region AS by increasing the area of the land portions 14 in contact with the ground in the shoulder region AS. In addition, the groove area in the center region AC is increased, so the water drainage properties can be improved.

Also, preferably, at least one circumferential groove 12 extending in the tire circumferential direction is provided in the center region AC. This is because the degradation in water drainage properties can be suppressed by reducing the groove area ratio GR while sufficiently maintaining the groove area of the center region AC. For a similar reason, more preferably, the groove width of the circumferential groove 12 provided in the center region AC is wide, specifically not less than 7 mm, and more preferably, not less than two circumferential grooves 12 are provided in the center region AC.

Also, preferably, at least two lateral grooves 16C extending from the ground contact width edge WE, which is the edge in the tire width direction of the ground contact region G located in the shoulder region AS, toward the tire equatorial line CL are provided within the ground contact region G of the tread portion 10, and the ratio of the pitch A between adjacent lateral grooves 16C and the ground contact length L satisfies:

$$0.2 < A/L \leq 0.5 \qquad <5>.$$

By providing the lateral grooves 16C in this way, the reduction in water drainage properties in the shoulder region AS can be suppressed. Here, the pitch A refers to the dimension at the location where the pitch is greatest from among the pitches in the tire circumferential direction between lateral grooves 16C arranged adjacent to each other in the tire circumferential direction (see FIG. 2).

If "A/L" is equal to or less than 0.2, the length in the tire circumferential direction of land portions 14C between lateral grooves 16C in the shoulder region AS becomes shorter. As a result, the tread stiffness in the shoulder region AS is reduced, and it is difficult to improve the steering stability. If "A/L" is greater than 0.5, the number of lateral grooves located in the shoulder region AS is reduced, and it is difficult to suppress the reduction in water drainage properties.

Also, for a similar reason as equation <5>, preferably, from 28 to 72 lateral grooves 16C are provided on the periphery of the pneumatic tire 1 in the shoulder regions AS located on both sides of the tire equatorial line CL. By providing the lateral grooves 16C in this way, the reduction in water drainage properties in the shoulder regions AS can be suppressed.

(Modified Example)

Figure 3:
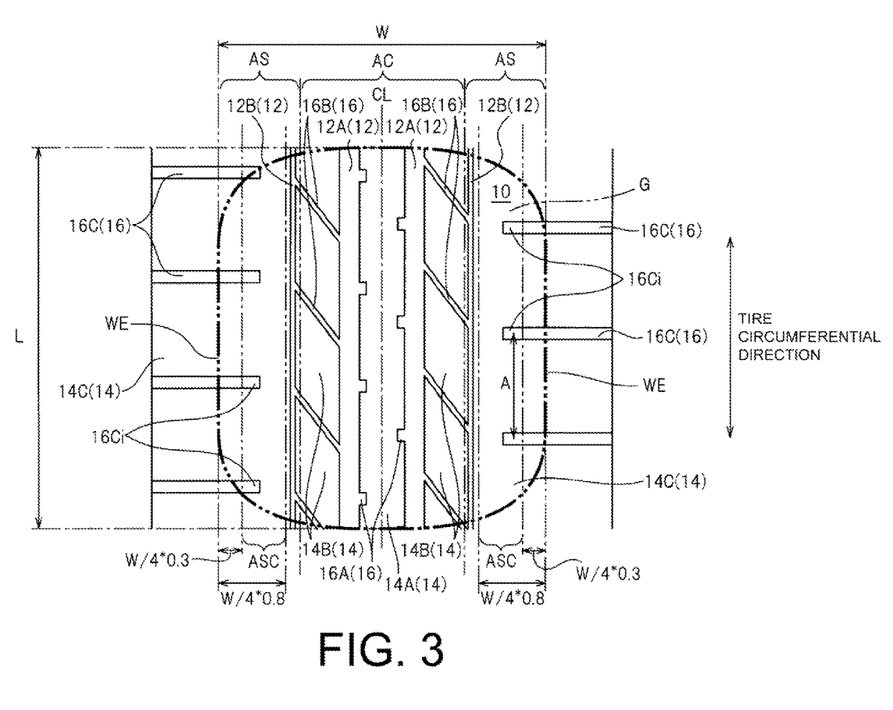
FIG. 3 is a plan development view illustrating a portion of the tread portion of the pneumatic tire according to a modified example of the embodiment of the present technology.

FIG. 3 is a plan development view illustrating a portion of the tread portion of the pneumatic tire according to a modified example of the embodiment of the present technology. This modified example differs from the present embodiment in that the lateral grooves 16C do not communicate with the circumferential grooves 12.

The circumferential grooves 12 extending in the tire circumferential direction and the lateral grooves 16C extending from the ground contact width edge WE located in the shoulder region AS toward the tire equatorial line CL are provided on the tread portion 10 of the pneumatic tire 1 according to this modified example, but the lateral grooves 16C do not communicate with the circumferential grooves 12. In other words, in this modified example, the inner side edge 16Ci in the tire width direction of the lateral groove 16C is not connected to the circumferential groove 12C located on the outermost side in the tire width direction.

First, by providing the lateral grooves 16C in the shoulder region AS, the reduction in water drainage properties can be suppressed. When the lateral groove 16C does not communicate with the circumferential groove 12C as in the present modified example, the land portion 14C is not divided by the lateral groove 16C but is integral. In this way, the stiffness of the tread portion 10 is increased in particular in the shoulder region AS, so sufficient cornering force can be obtained, which is desirable in terms of improving the steering stability.

Note that, as illustrated in FIG. 3, more preferably, the inner side edge 16Ci in the tire width direction of the lateral groove 16C is located within a region ASC located from 30% to 80% of the width of the shoulder region AS, in other words, ¼ of the ground contact width W, from the ground contact width edge WE. This is because as stated previously, both suppression of the reduction in water drainage properties by providing the lateral grooves 16C and increasing the stiffness of the shoulder region AS can be achieved. However, the inner side edge 16Ci may be arranged outward of the region ASC.

Also, preferably, the depth of the lateral groove 16C extending from the ground contact width edge WE, which is the edge in the tire width direction of the ground contact region G located in the shoulder region AS, toward the tire equatorial line CL is shallower than the depth of the circumferential groove 12. This is because by making the depth of the lateral groove 16C shallower, the stiffness of the tread portion 10 is increased in particular in the shoulder region AS, so sufficient cornering force can be obtained, and the steering stability can be improved.

EXAMPLES

Various tire performance tests, such as RRC index, fuel efficiency index, steering stability, resistance to hydroplaning (water drainage properties), were carried out under various conditions on pneumatic tires according to working examples.

In these performance tests, each test tire was assembled onto a rim with a compatible size as described above, and were filled to an internal pressure of 230 kPa for the actual vehicle tests.

The following is a description of the test methods for the performance tests carried out on the test tires.
(RRC Index)

Using a drum test machine with a drum diameter of 1707.6 mm, the rolling resistance was measured in accordance with ISO 28580, under the conditions of air pressure of 210 kPa, and speed of 80 km/h. The evaluation results were expressed using the inverse value as the measurement value, indexed with the conventional example being 100. Lower index values indicate less rolling resistance.

(Fuel Efficiency Performance)

The test tires were fitted to a front wheel drive vehicle with an engine displacement of 1800 cc, driven for 50 laps at a speed of 100 km/h on a test course of total length 2 km, and the fuel economy improvement rate was measured relative to the fuel consumption of a Conventional Example as 100. Larger index values indicate better the fuel economy.
(Steering Stability)

The test tires were assembled onto a standard rim and fitted to a passenger car (engine displacement 1800 cc), and the feeling when changing lanes when driven for three laps on a test course of 2 km per lap was evaluated by three specialist drivers. The evaluation results for the average value of the evaluation points for each test tire was expressed as an index, with the average value of the feeling evaluation points of Comparative Example 1 as 100. Larger index values indicate superior steering stability.
(Resistance to Hydroplaning)

Resistance to hydroplaning was evaluated by carrying out a straight line hydroplaning test, and measuring the speed at which hydroplaning occurred. In this straight line hydroplaning test, the test vehicle was driven into a pool of water depth 10 mm while increasing the velocity, and the slip ratio of the pneumatic tire was measured. The velocity at which the slip ratio was 10% was taken to be the velocity at which hydroplaning occurs. In this test, the measurement results for tests other than the Conventional Example were expressed as an index with the measurement results of the Conventional Example as 100. With this Working Example, larger index values indicate better resistance to hydroplaning.

The following is a description of each of the test tires and the performance test results.
(Conventional Example)

The pneumatic tire according to the Conventional Example was a tire of size 205/55R16, the value of "SW/OD" was 0.32, in other words, equation <1> was not satisfied. The tread portion of the pneumatic tire according to the Conventional Example was provided with the tread pattern illustrated in FIG. 4.

Working Examples 1 to 14

The pneumatic tires according to Working Examples 1 to 14 had tire sizes that were different from each other, and "SW/OD" took values within the range from 0.3 to 0.21, in other words, equation <1> was satisfied. On the tread portion 10 of the pneumatic tires according to Working Examples 1 to 14, tread patterns were provided based on the tread pattern illustrated in FIG. 4, modified to conform to each tire size.

Performance tests for RRC index and fuel efficiency index were carried out for the Conventional Example and Working Examples 1 to 14. Table 3 shows the dimensions for each test tire and the performance test results.

TABLE 3

|  | Conventional Example | Working Example 1 | Working Example 2 | Working Example 3 | Working Example 4 | Working Example 5 | Working Example 6 | Working Example 7 |
|---|---|---|---|---|---|---|---|---|
| Nominal width | 205 | 185 | 195 | 175 | 185 | 155 | 165 | 175 |
| Aspect ratio | 55 | 55 | 50 | 60 | 50 | 60 | 55 | 50 |
| Inner diameter (inches) | 16 | 17 | 18 | 17 | 19 | 17 | 18 | 20 |

TABLE 3-continued

| | | | | | | | | |
|---|---|---|---|---|---|---|---|---|
| OD (mm) | 632 | 640.8 | 657.2 | 647.8 | 672.6 | 623.8 | 644.2 | 688 |
| SW/OD | 0.32 | 0.30 | 0.30 | 0.28 | 0.28 | 0.26 | 0.26 | 0.26 |
| RRC index | 100 | 99 | 99 | 98 | 98 | 98 | 96 | 96 |
| Fuel efficiency index | 100.0 | 100.1 | 100.1 | 100.1 | 100.1 | 100.1 | 100.2 | 100.1 |

| | Working Example 8 | Working Example 9 | Working Example 10 | Working Example 11 | Working Example 12 | Working Example 13 | Working Example 14 |
|---|---|---|---|---|---|---|---|
| Nominal width | 145 | 155 | 165 | 145 | 155 | 145 | 145 |
| Aspect ratio | 65 | 60 | 55 | 70 | 60 | 65 | 55 |
| Inner diameter (inches) | 17 | 19 | 20 | 17 | 20 | 19 | 21 |
| OD (mm) | 626.8 | 674.6 | 695 | 641.8 | 700 | 677.6 | 698.4 |
| SW/OD | 0.24 | 0.24 | 0.24 | 0.23 | 0.23 | 0.22 | 0.21 |
| RRC index | 97 | 95 | 96 | 95 | 93 | 94 | 93 |
| Fuel efficiency index | 100.2 | 100.3 | 100.2 | 100.3 | 100.3 | 100.2 | 100.2 |

According to the performance test results in Table 3, the test tires according to Working Examples 1 to 14 that satisfied equation <1> had better RRC index and fuel efficiency index than the Conventional Example, and therefore the rolling resistance was reduced.

Working Examples 15 to 17 and Comparative Examples 1 to 3

The pneumatic tires according to Working Examples 15 to 17 and Comparative Examples 1 to 3 had a tire size of 165/55R20. The pneumatic tire according to Comparative Example 1 was a test tire in which the tire size only was changed from the Conventional Example. Also, the pneumatic tires according to Working Examples 15 to 17 and Comparative Examples 2 to 3 were test tires in which "GSR/GCR" was 0.4 and the groove area ratio GR was varied within the range from 6 to 30%. Here, Working Examples 15 to 17 satisfied the relationships of all of equations <1> to <3>, but Comparative Examples 1 to 3 did not satisfy the relationship of equation <2>.

Comparative Example 1 was a reference tire for steering stability as discussed above. In other words, in the present technology, for the steering stability, the tire size was changed to the narrow width large diameter tire size for rolling resistance, so a tire with the reduced steering stability is taken as a reference. Also, the extent to which the steering stability of the pneumatic tires according to the Working Examples has been improved relative to Comparative Example 1 was evaluated.

Figure 4:
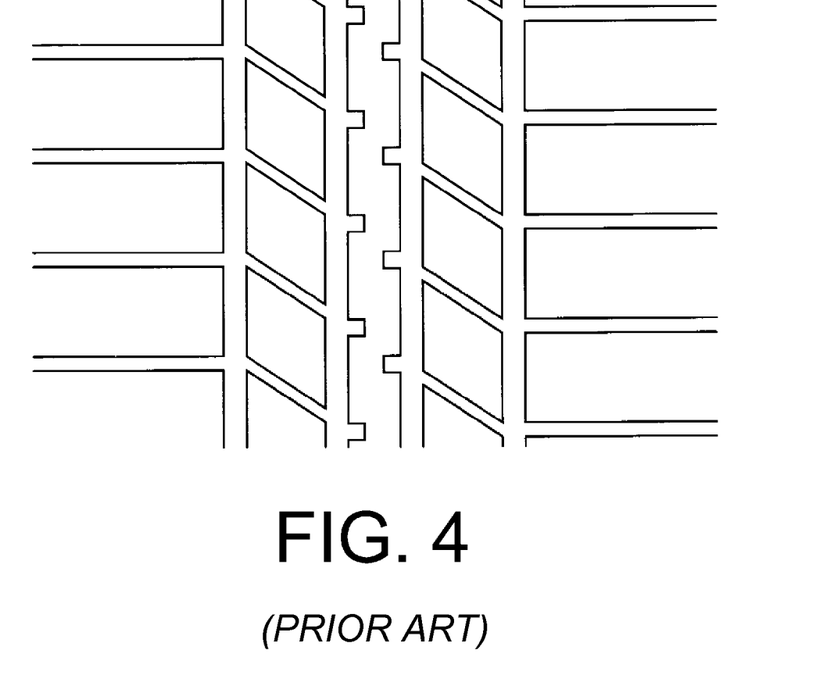
FIG. 4 is a plan development view illustrating a portion of the tread portion of the pneumatic tire according to a conventional example.

Here, the tread portion of the pneumatic tires according to the Working Examples and the Comparative Examples were provided with the tread pattern of the Conventional Example, in other words, using the tread pattern of FIG. 4 as basis, the tread pattern which was changed to conform to the groove area ratio GR and other dimensional parameters set for each test tire. As one example, the tread portion of the pneumatic tire according to Working Example 15 was provided with the tread pattern illustrated in FIG. 2. Likewise, in the pneumatic tires according to the Working Examples and the Comparative Examples, using the tread pattern of FIG. 4 as the basis and varying the groove area of the circumferential grooves 12 and the lateral grooves 16 and the number of circumferential grooves 12 and their positions in the tire width direction, different patterns were made to conform to each of the dimensional parameters of each test tire, as in the tread pattern illustrated in FIG. 2.

For the pneumatic tires according to the Conventional Example, Working Examples 15 to 17, and Comparative Examples 1 to 3, performance tests were carried out for the fuel efficiency index, steering stability, and resistance to hydroplaning (indicated as "Hydro performance" in Table 4, likewise in Tables 5 to 7). Table 4 shows numerical values of the dimensions for each test tire, and the performance test results.

TABLE 4

| | Conventional Example | Comparative Example 1 | Comparative Example 2 | Working Example 15 | Working Example 16 | Working Example 17 | Comparative Example 3 |
|---|---|---|---|---|---|---|---|
| Nominal width | 205 | 165 | 165 | 165 | 165 | 165 | 165 |
| Aspect ratio | 55 | 55 | 55 | 55 | 55 | 55 | 55 |
| Inner diameter (inches) | 16 | 20 | 20 | 20 | 20 | 20 | 20 |
| OD (mm) | 632 | 695 | 695 | 695 | 695 | 695 | 695 |
| SW/OD | 0.32 | 0.24 | 0.24 | 0.24 | 0.24 | 0.24 | 0.24 |
| GR (%) | 30 | 30 | 8 | 15 | 20 | 25 | 30 |
| GSR/GCR | 1.0 | 1.0 | 0.4 | 0.4 | 0.4 | 0.4 | 0.4 |
| Fuel efficiency index | 100 | 100.3 | 100.3 | 100.3 | 100.3 | 100.3 | 100.3 |

TABLE 4-continued

|  | Conventional Example | Comparative Example 1 | Comparative Example 2 | Working Example 15 | Working Example 16 | Working Example 17 | Comparative Example 3 |
|---|---|---|---|---|---|---|---|
| Steering stability | 106 | 100 | 105 | 104 | 103 | 102 | 98 |
| Hydro performance | 100 | 108 | 92 | 101 | 105 | 106 | 107 |

According to the performance test results of Table 4, the test tires according to Working Examples 15 to 17 that satisfied the relationships of equations <1> to <3> had a higher fuel efficiency index than the Conventional Example, and a higher steering stability than Comparative Example 1. In other words, these test tires had reduced rolling resistance, and the degradation in steering stability performance associated with this was improved.

Working Examples 18 to 22, Comparative Example 4

The pneumatic tires according to Working Examples 18 to 22 and Comparative Example 4 were test tires with a tire size of 165/55R20, the groove area ratio GR was 20%, and "CSR/GCR" varied within the range from 0.0 to 1.2. As stated above, the tread portions of the pneumatic tires according to these Working Examples and the Comparative Example were provided with a tread pattern that was modified using that in FIG. 4 as basis. Here, Working Examples 18 to 22 satisfied the relationships of equations <1> to <3>. In addition, Working Examples 19 to 22 satisfied the relationship of equation <4>, but Working Example 18 did not satisfy the relationship of equation <4>.

Performance tests for fuel efficiency index, steering stability, and resistance to hydroplaning were carried out on the pneumatic tires according to the Conventional Example, Working Examples 19 to 23, and Comparative Examples 1 and 4. Table 5 shows the numerical values of the dimensions of each test tire, the test conditions, and the performance test results.

According to the performance test results of Table 5, the pneumatic tires according to Working Examples 19 to 21, which additionally satisfied the relationship of equation <4>, had superior steering stability and resistance to hydroplaning than the tires of Working Example 18 and Comparative Example 4.

Working Examples 23 to 28

The pneumatic tires according to Working Examples 23 to 28 had a tire size of 165/55R20, and as stated above, the tread portions of the pneumatic tires according to Working Examples 23 to 28 were provided with tread patterns that were varied using that in FIG. 4 as basis. Here, Working Examples 25 to 27 additionally satisfied the relationship of equation <5>, but Working Examples 23, 24, and 28 did not satisfied the relationship of equation <5>.

Performance tests for fuel efficiency index, steering stability, and resistance to hydroplaning were carried out on the pneumatic tires according to the Conventional Example, Comparative Example 1, and Working Examples 23 to 28. Table 6 shows the numerical values of the dimensions of each test tire, the test conditions, and the performance test results.

TABLE 5

|  | Conventional Example | Comparative Example 1 | Comparative Example 4 | Working Example 18 | Working Example 19 | Working Example 20 | Working Example 21 | Working Example 22 |
|---|---|---|---|---|---|---|---|---|
| Nominal width | 205 | 165 | 165 | 165 | 165 | 165 | 165 | 165 |
| Aspect ratio | 55 | 55 | 55 | 55 | 55 | 55 | 55 | 55 |
| Inner diameter (inches) | 16 | 20 | 20 | 20 | 20 | 20 | 20 | 20 |
| OD (mm) | 632 | 695 | 695 | 695 | 695 | 695 | 695 | 695 |
| SW/OD | 0.32 | 0.24 | 0.24 | 0.24 | 0.24 | 0.24 | 0.24 | 0.24 |
| GR (%) | 30 | 30 | 20 | 20 | 20 | 20 | 20 | 20 |
| GSR/GCR | 1.0 | 1.0 | 1.2 | 0.8 | 0.6 | 0.4 | 0.2 | 0.0 |
| Fuel efficiency index | 100 | 100.3 | 100.3 | 100.3 | 100.3 | 100.3 | 100.3 | 100.3 |
| Steering stability | 106 | 100 | 95 | 101 | 102 | 103 | 102 | 102 |
| Hydro performance | 100 | 108 | 97 | 101 | 104 | 105 | 103 | 99 |

TABLE 6

|  | Conventional Example | Comparative Example 1 | Working Example 23 | Working Example 24 | Working Example 25 | Working Example 26 | Working Example 27 | Working Example 28 |
|---|---|---|---|---|---|---|---|---|
| Nominal width | 205 | 165 | 165 | 165 | 165 | 165 | 165 | 165 |
| Aspect ratio | 55 | 55 | 55 | 55 | 55 | 55 | 55 | 55 |
| Inner diameter (inches) | 16 | 20 | 20 | 20 | 20 | 20 | 20 | 20 |
| OD (mm) | 632 | 695 | 695 | 695 | 695 | 695 | 695 | 695 |
| SW/OD | 0.32 | 0.24 | 0.24 | 0.24 | 0.24 | 0.24 | 0.24 | 0.24 |
| GR (%) | 30 | 30 | 20 | 20 | 20 | 20 | 20 | 20 |
| GSR/GCR | 1.0 | 1.0 | 0.4 | 0.4 | 0.4 | 0.4 | 0.4 | 0.4 |
| A/L | 0.2 | 0.2 | 0.1 | 0.2 | 0.3 | 0.4 | 0.5 | 0.6 |
| Fuel efficiency index | 100 | 100.3 | 100.3 | 100.3 | 100.3 | 100.3 | 100.3 | 100.3 |
| Steering stability | 106 | 100 | 101 | 103 | 104 | 104 | 105 | 106 |
| Hydro performance | 100 | 108 | 102 | 104 | 106 | 105 | 104 | 101 |

According to the performance test results of Table 6, the pneumatic tires according to Working Examples 25 to 27, which satisfied the relationship of equation <5> had superior resistance to hydroplaning than the other Working Examples. In other words, the water drainage properties were improved.

Working Examples 29 to 30, Comparative Example 5

The pneumatic tires according to Working Examples 29 to 30 and Comparative Example 5 had a tire size of 165/55R20. The tread portion of the pneumatic tire according to Comparative Example 5 was provided with a tread pattern that was modified using that in FIG. 4 as basis, as described above. On the other hand, the tread portions of the pneumatic tires according to Working Examples 29 and 30 were provided with tread patterns in which the lateral grooves that extended from the ground contact width edge toward the tire equatorial line did not communicate with the circumferential grooves, as illustrated in FIG. 3 as a modified example of the above embodiment. In addition, the depth of the lateral grooves provided in the tread portion of the pneumatic tire according to Working Example 30 was 5 mm, shallower than the 8 mm depth of the circumferential grooves. Note that the tread portions of the pneumatic tires according to Working Examples 29 and 30 were provided with the tread pattern illustrated in FIG. 3.

Performance tests for fuel efficiency index, steering stability, and resistance to hydroplaning were carried out on the pneumatic tires according to the Conventional Example, Working Examples 29 and 30, and Comparative Examples 1 and 5. Table 7 shows the numerical values of the dimensions of each test tire, the test conditions, and the performance test results. Note that in the item "Lateral groove communication" in Table 7, "Communicates" indicates that the lateral grooves that extend from the ground contact width edge toward the tire equatorial line communicate with the circumferential grooves, and "No communication" indicates that the lateral grooves do not communicate with the circumferential grooves. In addition, in the item "Groove depth (circumferential/lateral)" in Table 7, for example, "8/5" indicates that the depth of the circumferential grooves was 8 mm, and the depth of the lateral grooves extending from the ground contact width edge toward the tire equatorial line was 5 mm.

TABLE 7

|  | Conventional Example | Comparative Example 1 | Comparative Example 5 |
|---|---|---|---|
| Nominal width | 205 | 165 | 165 |
| Aspect ratio | 55 | 55 | 55 |
| Inner diameter (inches) | 16 | 20 | 20 |
| OD (mm) | 632 | 695 | 695 |
| SW/OD | 0.32 | 0.24 | 0.24 |
| GR (%) | 30 | 30 | 30 |
| GSR/GCR | 1.0 | 1.0 | 1.0 |
| A/L | 0.2 | 0.2 | 0.2 |
| Lateral groove communication | Communicates | Communicates | Communicates |
| Groove depth (circumferential/lateral) | 8/8 | 8/8 | 8/8 |
| Fuel efficiency index | 100 | 100.3 | 100.3 |
| Steering stability | 106 | 100 | 102 |
| Hydro performance | 100 | 108 | 103 |

|  | Working Example 29 | Working Example 30 |
|---|---|---|
| Nominal width | 165 | 165 |
| Aspect ratio | 55 | 55 |
| Inner diameter (inches) | 20 | 20 |
| OD (mm) | 695 | 695 |
| SW/OD | 0.24 | 0.24 |
| GR (%) | 18 | 18 |
| GSR/GCR | 0.4 | 0.4 |
| A/L | 0.3 | 0.3 |
| Lateral groove communication | No communication | No communication |
| Groove depth (circumferential/lateral) | 8/8 | 8/5 |
| Fuel efficiency index | 100.3 | 100.3 |
| Steering stability | 105 | 106 |
| Hydro performance | 104 | 104 |

According to the performance test results of Table 7, the pneumatic tires according to Working Examples 29 and 30, in which the lateral grooves extending from the ground contact width edge toward the tire equatorial line did not communicate with the circumferential grooves, had superior fuel efficiency index to the Conventional Example, and had superior steering stability to Comparative Example 1 and Comparative Example 5, and in addition, the steering stability was equal to that of the Conventional Example. In other words, these tests tires had the advantages of reduced rolling resistance, while at the same time improved steering stability.

Also, the steering stability index of the pneumatic tire according to Working Example 30, in which the depth of the lateral grooves provided on the tread portion extending from the ground contact width edge toward the tire equatorial line was shallower than that of the circumferential grooves, was higher than that of Working Example 29, in which the groove depth was the same depth of 8 mm for both the circumferential grooves and the lateral grooves.

Note that the present technology has been described in detail based upon specific embodiments, but a person skilled in the art can make various changes and modifications without deviating from the scope of the claims and the concepts of the present technology.

The present technology is defined as follows.

(1) A pneumatic tire including grooves on a tread portion, the ratio of the total width SW and the outer diameter OD of the pneumatic tire SW/OD satisfying:

$$SW/OD \leq 0.3$$

and in the ground contact region of the tread portion, when the groove area ratio with respect to the ground contact area is GR, the ground contact width is W, the region having a width of 50% of the ground contact width W and the tire equatorial plane as center is the center region AC, the groove area ratio in the center region AC is GCR, the ground contact region on the outer side in the tire width direction from the center region AC is the shoulder region AS, and the groove area ratio in the shoulder region AS is GSR, the ground contact region of the tread portion being formed to satisfy:

$$10\% \leq GR \leq 25\%$$

$$GCR > GSR.$$

(2) The pneumatic tire according to (1), wherein the ratio of GCR and GSR satisfies:

$$0 < GSR/GCR \leq 0.6.$$

(3) The pneumatic tire according to (1) or (2), wherein at least two lateral grooves extending from the ground contact width edge located in the shoulder region toward tire equatorial line are provided in the ground contact region of the tread portion, and the ratio of the pitch A of the lateral grooves and the ground contact length L satisfies:

$$0.2 < A/L \leq 0.5.$$

(4) The pneumatic tire according to (3), wherein the circumferential groove extending in the tire circumferential direction is provided in the tread portion, and the lateral grooves do not communicate with the circumferential groove.

(5) The pneumatic tire according to (4), wherein the depth of the lateral grooves is shallower than the depth of the circumferential groove.

(6) The pneumatic tire according to (1) or (2), wherein in the tread portion, the circumferential groove extending in the tire circumferential direction, and the lateral groove extending from the ground contact width edge located in the shoulder region toward the tire equatorial line are provided, and the lateral groove does not communicate with the circumferential groove.

(7) The pneumatic tire according to (6), wherein the depth of the lateral groove is shallower than the depth of the circumferential groove.

The pneumatic tire according to the present technology can be beneficially used as a pneumatic tire for improved fuel economy for passenger vehicles.

What is claimed is:

1. A pneumatic tire comprising grooves on a tread portion, wherein
   the grooves comprise at least two circumferential main grooves, at least two circumferential thin grooves, and at least one lateral groove extending from one of the circumferential thin grooves toward a tire equator line,
   a land portion is disposed between the two circumferential main grooves and includes the tire equator line,
   the at least two circumferential thin grooves have a groove width less than that of the at least two circumferential main grooves,
   a ratio SW/OD of a total width SW and an outer diameter OD of the pneumatic tire satisfies SW/OD≤0.3,
   in a ground contact region of the tread portion, when a groove area ratio in a ground contact area is GR, a ground contact width is W, a region having a width of 50% of a ground contact width W and a tire equatorial plane as center is a center region AC, a groove area ratio in the center region AC is GCR, a ground contact region on an outer side in a tire width direction from the center region AC is a shoulder region AS, and a groove area ratio in the shoulder region AS is GSR, the ground contact region of the tread portion is formed to satisfy 10%≤GR≤25% and GCR>GSR, and
   a ratio of GCR and GSR satisfies 0.1<GSR/GCR≤0.4.

2. The pneumatic tire according to claim 1, wherein at least two lateral grooves extending from a ground contact width edge located in the shoulder region toward a tire equatorial line are provided in the ground contact region of the tread portion, and
   a ratio of a pitch A of the at least two lateral grooves and a ground contact length L satisfies:

$$0.2 < A/L \leq 0.5.$$

3. The pneumatic tire according to claim 2, wherein the at least two lateral grooves do not communicate with the circumferential thin grooves.

4. The pneumatic tire according to claim 3, wherein a depth of the at least two lateral grooves is shallower than a depth of the circumferential thin groove.

5. The pneumatic tire according to claim 1, further comprising:
   a shoulder lateral groove extending from a ground contact width edge located in the shoulder region toward a tire equatorial line is provided.

6. The pneumatic tire according to claim 5, wherein a depth of the shoulder lateral groove is shallower than a depth of the circumferential thin grooves.

7. The pneumatic tire according to claim 1, wherein the circumferential thin grooves are provided in the shoulder region AS.

8. The pneumatic tire according to claim 1, wherein 0.26≤SW/OD≤0.30.

* * * * *